No. 746,363. PATENTED DEC. 8, 1903.
F. L. McGAHAN.
NUT LOCK.
APPLICATION FILED MAR. 2, 1903.
NO MODEL.
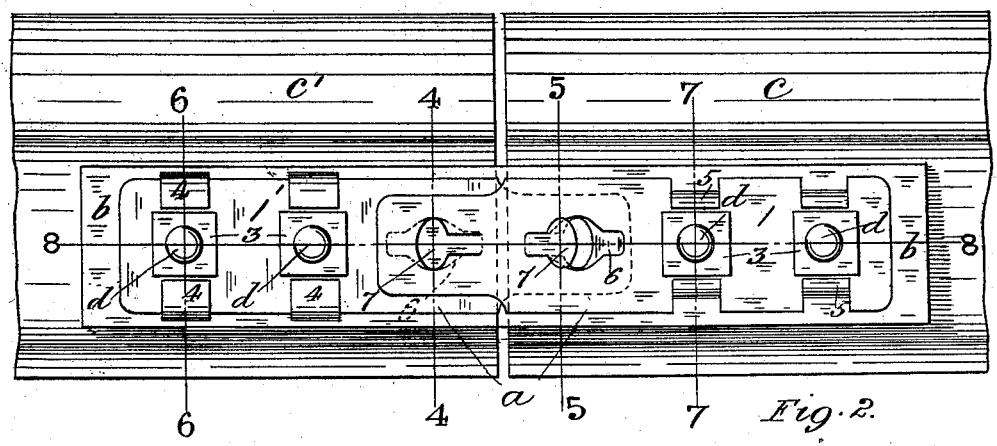
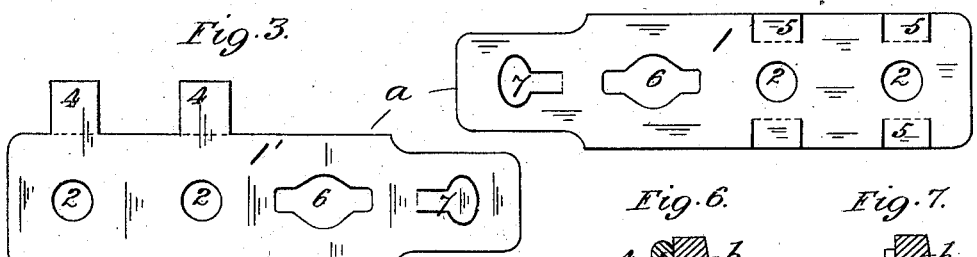
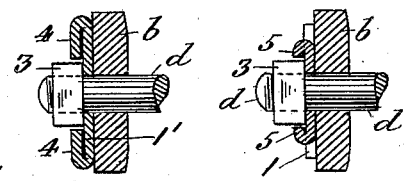
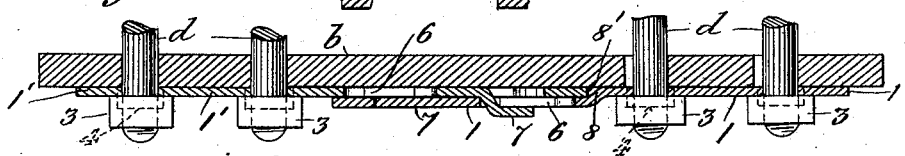
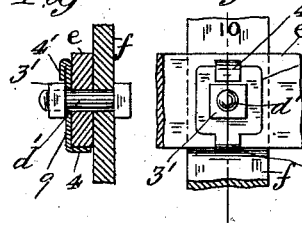
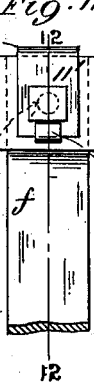
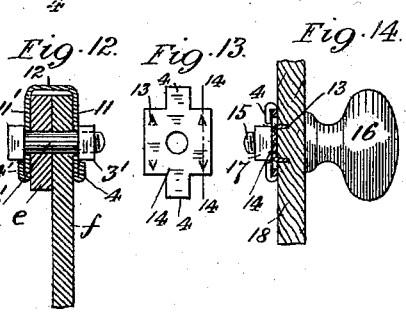
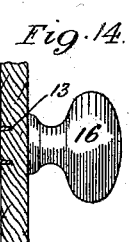
WITNESSES
J. M. Benbow
G. L. Belfry
INVENTOR
Frederick L. McGahan
By Edward W. Furrell
His Atty No. 746,363. Patented December 8, 1903.

UNITED STATES PATENT OFFICE.

FREDERICK L. McGAHAN, OF ST. LOUIS, MISSOURI.

NUT-LOCK.

SPECIFICATION forming part of Letters Patent No. 746,363, dated December 8, 1903.

Application filed March 2, 1903. Serial No. 145,815. (No model.)

*To all whom it may concern:*

Be it known that I, FREDERICK L. MCGAHAN, a citizen of the United States, residing at St. Louis, in the State of Missouri, have invented a new and useful Improvement in Nut-Locks, of which the following is a specification.

My invention relates to a nut-lock and to means combined therewith when applied to the fish-bolt nuts of a rail-joint for preventing lateral play of the bolts in the holes therefor through the fish-plates, and thereby insuring a rigid rail-joint.

The invention consists in features of novelty, as hereinafter described and claimed, reference being had to the accompanying drawings, forming part of this specification, whereon—

Figure 1 is a side elevation of my improved nut-locking device as applied to the fish-bolt nuts of an ordinary rail-joint; Figs. 2 and 3, corresponding views to Fig. 1 of the blanks from which the two parts of the device seen to the right and left, respectively, of the rail-joint are formed; Figs. 4, 5, 6, and 7, vertical transverse sections through the locking device and one of the fish-plates on lines 4 4, 5 5, 6 6, and 7 7, respectively, in Fig. 1; Fig. 8, a horizontal section through the same on line 8 8 in Fig. 1; Fig. 9, a side view of the nut-lock applied to a bolt for securing two cross-bars together, and Fig. 10 a cross-section thereof on line 10 10 in Fig. 9; Figs. 11 and 12, corresponding views to Figs. 9 and 10, respectively, showing a modification of the nut-lock; Fig. 13, a side view of the blank from which the nut-lock is formed when applied to a nut tightened against a wood surface, and Fig. 14 a cross-section on line 14 14 in Fig. 13 through the nut-lock formed from the blank and applied to the nut on the screw-threaded shank of a handle for securing the latter to the front side of a drawer or analogous object.

Like letters and numerals of reference denote like parts in all the figures.

Referring to Figs. 1, 2, 3, 4, 5, 6, 7, and 8, *a* represents my improved nut-locking device as applied to a rail-joint. The device *a* consists of two rectangular plates or washers 1 1', (hereinafter termed "washers",) which are composed, preferably, of sheet metal and alined to each other along the outer face of the fish-plate *b*, the washer 1 being opposite to the rail *c* and partly overlapping the washer 1', which is opposite to the rail *c'*, or, in other words, to the right and left, respectively, of the rail-joint, as shown.

Through the washers 1 and 1' are formed the holes 2, corresponding, respectively, to the holes in the rails *c c'* and fish-plates *b* for receiving the bolts *d*, the nuts 3 of which are tightened against the washers 1 and 1'. Integral with and projecting from the horizontal edges of the washer 1' in the plane of the latter and opposite to each bolt-hole 2 is a preferably square-shaped tongue 4, which when the nut 3 of the corresponding bolt *d* has been tightened against the washer 1' is bent outward along the edge of the washer 1', as indicated by the broken line in Fig. 3, and thence directed toward the bolt *d*, parallel, or thereabout, to the outer face of the washer 1', until the free end edge of the tongue 4 is in close proximity to the adjacent side of the nut 3, as seen particularly in Fig. 6, which is thereby prevented from turning on the bolt *d*.

The washer 1, in lieu of having tongues 4 projecting from its horizontal edges, as described for the washer 1', is stamped or cut into for a suitable distance from the said edges, so as to form a tongue 5 opposite to each bolt-hole 2, the tongue 5 being bent outward along the broken line indicated in Fig. 2, and thence directed toward the bolt *d* until its free end edge is in close proximity to the nut 3 of the corresponding bolt *d* in a similar manner to the tongues 4 of the washer 1', or, if preferred, the tongues 5 may be formed in the same manner as the tongues 4, or vice versa.

Through the overlapping portions, respectively, of the washers 1 1' is formed a hole or slotway 6, the two holes 6 being so arranged that when the washers 1 1' are in position on the bolts *d*, as seen in Fig. 1, the hole 6 of the washer 1 will be opposite to a tongue 7, stamped from and united at one end to the washer 1', and vice versa. By this means when the space between the ends of the rails *c c'* to be joined is excessive, which frequently occurs, and when in consequence thereof the holes through the fish-plates *b* are out of true and have to be correspondingly elongated for the passage of the bolts $d$ therethrough, as seen in Fig. 8, the washers 1 1' are adjusted by sliding one on the other until the holes 2 therethrough register with the bolts $d$, when the tongue 7 of the washer 1' is bent outward through and engages the edge of the hole 6 in the washer 1, so as to lock the washers 1 1' together, and the nuts 3 being then tightened home against the washers 1 1' the washer 1 is thereby drawn against the fish-plate $b$ until its inner side is flush with the inner side of the washer 1', and in so doing a shoulder 8 is formed in the washer 1, which butts against the lapped end 8' of the washer 1', and so renders the washers 1 1' practically continuous and rigid, whereby the lateral movement of the bolts $d$ within the enlarged holes of the fish-plates $b$, due to the sliding tendency of the rails $c\ c'$, is prevented and a rigid joint maintained.

Figs. 9 and 10 show the nut-lock applied to the nut 3' of a bolt $d'$, which secures the two cross-bars $e$ and $f$ together, in which case one of the tongues 4 of the washer 9, which is analogous to the washers 1 1' in Fig. 1, is placed between the nut 3' and bar $e$ and turned laterally at its outer free end portion, so as to bear against the lower edge of the bar $e$, thereby preventing the washer 9 from turning around the bolt $d'$, the other tongue 4' of the washer 9 engaging the nut 3' of the bolt $d'$ in the manner before described.

In Figs. 11 and 12 the end of the bar $f$ is shown flush with the upper edge of the bar $e$, in which case the washer 11 between the nut 3' and the bar $e$ is united to a washer 11', placed between the head of the bolt $d'$ and the bar $f$ by a connecting-piece 12, which is integral with the washers 11 11' and straddles the bars $e f$ at the said edge, the bolt $d'$ passing through both washers 11 11', one of the tongues, 4, being adapted for locking the nut 3' and the other tongue, 4', for locking the head of the bolt $d'$, whereby the nut 3' can be tightened up while the bolt $d'$ is held from turning by the tongue 4', which is an important advantage in bridge construction.

Figs. 13 and 14 show the application of the lock-nut for securing a handle to the front side of a drawer or other woodwork, in which case two or more preferably triangular-shaped tangs 13 are stamped from the washer 14 and projected therefrom at right angles, the washer 14 being then placed on the screw-threaded shank 15 of the handle 16 between the nut 17 and the surface of the woodwork 18, so that on tightening home the nut 17 against the washer 14 the tangs 13 are forced into the woodwork 18, and thereby prevent the washer 14 from turning, the nut 17 being locked by the tongues 4 in the manner before described.

What I claim as my invention, and desire to secure by Letters Patent, is—

In a nut-lock, the combination with the bolts and fish-plates of a rail-joint, of a washer made in two parts and interposed between the nuts of the said bolts and the adjacent fish-plate, the said parts partly overlapping each other, a tongue integral with, and alined to the washer opposite to each of the said bolts, the said tongue being adapted to be turned outward parallel or thereabout to the face of the washer, a tongue formed in, and integral with one of the said parts and adapted to be turned outward through a hole in the corresponding overlapping portion of the other part, for engaging the edge of the said hole, and a shoulder formed on one of the said parts in the tightened position of the nuts for engaging the inner end of the other part, substantially as described.

In testimony whereof I have signed my name to this specification in the presence of two subscribing witnesses.

FREDERICK L. McGAHAN.

Witnesses:
G. L. BELFRY,
EDWARD W. FURRELL.